United States Patent Office 3,839,423
Patented Oct. 1, 1974

3,839,423
DEMETHYLATION PROCESS
Bennie J. Foster, Greenwood, and Eugene J. Fornefeld, Indianapolis, Ind., assignors to Eli Lilly and Company, Indianapolis, Ind.
No Drawing. Filed Dec. 19, 1973, Ser. No. 426,263
Int. Cl. C07c 85/04
U.S. Cl. 260—490                                          10 Claims

ABSTRACT OF THE DISCLOSURE

A novel of N-demethylation procedure between a tertiary amine and a haloalkyl chloroformate, to yield a carbamate, followed by reductive removal of the resulting carbamate to yield a secondary amine. Analgesic substances including noracymethadol and d-norpropoxyphene are produced.

BACKGROUND OF THE INVENTION

Most useful analgesic compounds are tertiary amines. When the tertiary amines are converted to secondary amines, the compounds usually lose the greater part of their analgesic activity. Thus, for example, the highly effective analgesics, morphine, codeine, and methadone, all tertiary amines, when converted to the corresponding secondary amino compounds, lose substantially all of their analgesic activity. Certain secondary amines such as those preparable by the processes of the present invention, however, do possess useful analgesic activity themselves or can be converted to useful analgesic substances such as noracymethadol carbamates, U.S. Pat. 3,755,416, by standard chemical procedures.

Methods described in the art useful for the N-demethylation of tertiary amines include oxidation with potassium permanganate, Ber. 29, 1575 (1896), Liebigs Ann. Chem. 708, 210 (1967); or potassium ferricyanide, J. Amer. Chem. Soc. 74, 5566 (1952); treatment with ethyl or phenyl chloroformates followed by hydrolysis, Tet. Lett. 1971 57–58; J. Med. Chem. 15, 208 (1972); and formation of an alkylazodicarboxylate reaction product followed by hydrolysis, U.S. Pat. 3,213,128. The oxidative demethylation procedures suffer from the defect that large volumes of solvents are required and the yields of product are low. In addition, the hydrolysis of carbamates produced by the above chloroformate procedures is difficult and in some cases none of the desired secondary amine can be obtained. In both of the chloroformate cases cited above, hydrolytic cleavage of the carbamate was employed. Hydrochloric acid was used in the method of the first reference, and a mixture of 1:4, 50% aqueous potassium hydroxide-ethanol in the method of the second chloroformate reference above. The dialkylazodicarboxylate method gives varying yields of the secondary amine product contaminated with small quantities of the tertiary amine.

The 2,2,2-trichloroethoxycarbonyl amine protecting group is described in Tet. Lett. 27, 2555–2557 (1967) and J. Org. Chem. 36, 1259 (1971). The 2-iodoethoxycarbonyl amine protecting group is described in J. Chem. Soc. 1965, 7136–7139. Removal of an N-benzyl group using trichloroethyl chloroformate is disclosed in J. Org. Chem. 38, 3281 (1973); however neither the trichloroethyl chloroformate nor the 2-iodoethyl chloroformate have been used to displace a methyl group from a tertiary amine heretofore.

It is an object of this invention to provide an N-demethylation procedure which avoids the drawbacks of the N-demethylation procedures presently available in the art.

SUMMARY OF THE INVENTION

In fulfillment of the above and other objects, this invention provides an N-demethylation process wherein a secondary amino compound is produced by reacting a tertiary N,N-dimethylamine of the formula

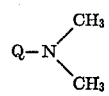

wherein Q is (a)

(a) 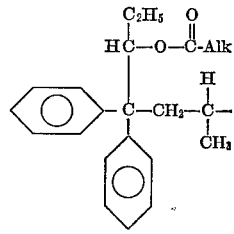

or (b) 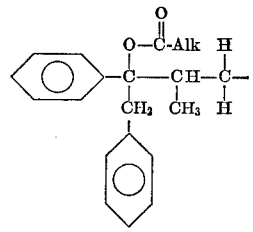

and Alk is $C_1$–$C_3$ alkyl, with a haloalkyl chloroformate to produce a haloalkyl carbamate. Reductive cleavage of the carbamate under non-hydrolyzing conditions produces the desired secondary amine, Q—NH—CH$_3$. In the formula, when Q is (a), the compounds are known generically as acymethadols and when Q is (b), and Alk is $C_2H_5$, the compounds are called propoxyhenes. The secondary amines thus produced are valuable as analgesic substances or as intermediates for preparing analgesic substances.

DETAILED DESCRIPTION

More specifically, the present invention provides a process for the preparation of secondary amines (I)

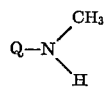    I wherein Q is (a) 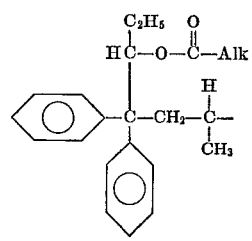

or (b) 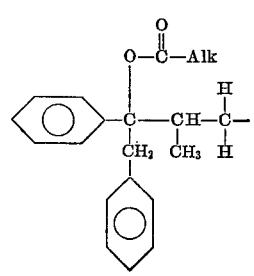

and wherein Alk is $C_1$–$C_3$ alkyl, by reacting a tertiary amine of Formula II

wherein Q has the same meaning as hereinabove, with a haloalkyl chloroformate of the formula

wherein R is $CH_2I$ or $CCl_3$, namely, 2,2,2-trichloroethyl chloroformate or 2-iodoethyl chloroformate. The final product of the reaction is a haloalkyl carbamate (III)

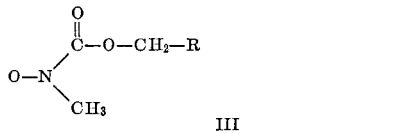

wherein Q and R are the same as defined above.

Reduction of the carbamate of Formula III with a dehydrohalogenating/reducing agent yields directly the desired secondary amino compound (I). This secondary amino compound may be isolated by standard procedures.

The compound of Formula I is preferably isolated as its acid addition salt by adding one molar equivalent of a carboxylic or mineral acid in an appropriate solvent such as acetone or ethyl acetate. The maleate salt of norpropoxyphene [I (b), Alk is ethyl], for example, is readily crystallized, allowing for ease of isolation and purification. The noracymethadols [I(a)] are readily isolated as their hydrochloride salts prepared according to standard procedures. Other secondary amine salts of the above compounds can be prepared by reconversion to the corresponding free base at reduced temperatures by treatment with mild alkali, followed by acidification of the free base with a different acid to form a new salt.

In the first step of the present process, the quantity of the haloalkyl chloroformate employed can vary from an equimolar amount to a large excess. The reaction is preferably carried out, however, using a slight excess of the haloalkyl chloroformate. The reaction between the haloalkyl chloroformate and the tertiary amine is carried out at a temperature in the range 60–180° C., preferably in the range 80–100° C. Upon completion of the carbamate formation, the excess haloalkyl chloroformate may be decomposed with a carboxylic acid, such as formic acid, in the presence of a hydrogen chloride scavenger such as triethylamine or pyridine.

To permit proper mixing of the reactants, an inert organic cosolvent is preferred, although excess haloalkyl chloroformate may be employed as the solvent. Inert cosolvents refer to those solvents which will not interact with the reagents employed. Acceptable inert organic cosolvents include aromatic hydrocarbon solvents, such as benzene, toluene, xylene, and the like, ethereal solvents such as 1,4-dioxane, butyl propyl ether, dipropyl ether, tetrahydrofuran and the like, halogenated hydrocarbon solvents such as 1,1,2-trichloroethane, chloroform, 1,1,2,2-tetrachloroethane, and the like, esters of carboxylic acids such as ethyl acetate, butyl acetate, and the like, and ketones such as 2-butanone, 3-pentanone and the like. The preferred solvent for the first step of the process is benzene.

The reaction is preferably carried out by addition of the haloalkyl chloroformate to a refluxing solution of the starting tertiary amine in the organic cosolvent, and the chloroformate is added dropwise to the reaction at such a rate that an even reflux rate is maintained. The evolution of methyl chloride, postulated as the by-product of the reaction, is no longer visible after about a one half hour further reflux period following completion of the chloroformate addition. However an additional reflux period of 1 to 2 hours is preferred for best results in the reaction. Thereafter, slow distillation of the organic solvent from the reaction mixture is carried out at atmospheric pressure during a one hour period, thereby concentrating the reaction mixture to approximately half-volume. Longer reflux periods, although not believed necessary, are not deleterious to the reaction. Although we do not wish to be bound by the particular mechanism proposed, it is postulated that an intermediate acyl quaternary compound is formed which is thermally decomposed to the carbamate during the heating period.

The second step of the present process involves reductive removal of the haloalkyl group using a metal reducing agent, such as zinc dust, in an alcohol, such as methanol, or in a weakly acidic medium. A carboxylic acid such as acetic acid or formic acid may be used as a solvent, or, preferably, the acid may be combined with a polar organic cosolvent such as dimethyl sulfoxide or dimethylformamide. It will be obvious to those skilled in the art that other organic solvents which contain a labile hydrogen may be used with the zinc dust, and dilute mineral acids may be used in combination with an organic co-solvent as a proton source for the zinc. Also, those skilled in the art will recognize that there are equivalent reducing agents which will remove a halogen from the haloalkyl protecting group thereby effecting carbamate removal.

The preferred conditions for reductive removal of the carbamate group comprise adding an excess of zinc dust (most preferably a one and a half molar equivalent excess) in formic acid (most preferably a one molar equivalent excess). A large volume of dimethylformamide is preferred, preferably 10 to 15 times the volume of the formic acid used.

In isolating the secondary amine from the above reaction, care must be taken to avoid high temperatures and high (alkaline) pH's, since the free bases of the final product (I) are converted intramolecularly by excess heat or strong alkali to the undesired amide IV

wherein Z is (a)

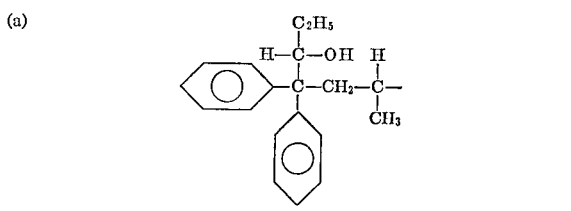

or (b)

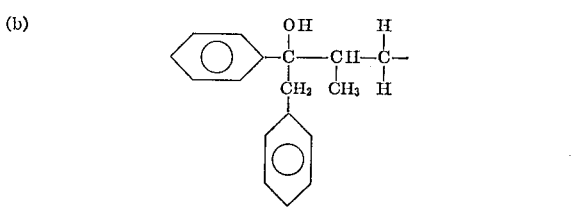

and wherein Alk is the same as defined hereinabove. Such a reaction is hereafter referred to as an O→N acyl migration.

It is an advantage of the novel process of this invention that the desired secondary amine is produced in high yield. In addition to producing high yields of product, a further advantage of the present process over existing demethylation methods is the high degree of purity of the product, which contains no detectable amount of tertiary amine. This high degree of purity is made possible by the fact that acid-base extractions are carried out at two different stages during the purification of the secondary amine product or an intermediate therefor. Since the carbamate of Formula III is neutral, it is possible to effect its separation by acid extraction of the basic tertiary amine of Formula II from which it is derived. Later in the process, the basic secondary amine of Formula I, ultimately produced, can be dissolved in dilute aqueous acid and any unreacted neutral carbamate of Formula III can be removed as an organic solvent soluble material. Another advantage of the process of this invention is the avoidance of the expensive and explosive dialkylazodicarboxylate, used for example in U.S. Pat. 3,213,128, in the process for the preparation of I (a). A further advantage of the present invention is that carbamates which are formed as intermediates are readily cleaved under very mildly acidic/reducing conditions. As will be apparent to those skilled in the art, the conventional acid hydrolysis of the carbamate group would also result in removal of the ester group. Conventional basic hydrolysis of a carbamate can also cause the O→N acyl shift previously discussed.

Each compound of Formulas I, II and III, for example, can exist in four diastereoisomeric forms occurring as two racemates or racemic mixtures, each of which can be resolved into dextro and levorotatory isomers. The two racemates have been arbitrarily designated as the α- and β- racemates, the designation α- having been given to that racemate, or diastereoisomeric pair, having the least soluble hydrochloride salt, while the other, having the more soluble salt, is called the β-racemate. In the case of compounds of Formula I (a), the noracymethadols, the α- and β-racemates have substantially the same analgesic activity; however, the d- and the l- forms of each racemate differ in the amount of analgesic activity they possess. Thus, the dextrorotatory isomer of the α-diastereoisomeric pair of the compound of Formula I (a) has a greater analgesic activity than the levorotatory enantiomorph.

If the α and β isomers of the compounds of Formula II are separated, the steric configuration is retained during the N-demethylation process of this invention; thus, the N-desmethyl product has the same configuration as its dimethylamino starting material. The α-d and α-l secondary amines in the noracymethadol series, I (a), are more active analgetically than the corresponding tertiary amines [II (a)] from which they are prepared. [See Eddy, Chem. and Ind. 1462–1469 (1959)]. The α-d secondary amine of the norpropoxyphene series [I (b)] is analgetically active also (Nickander, R. and Smits, S., Abstracts Fall 1973 Meeting Amer. Soc. for Pharm. and Exp. Ther.).

d-Norpropoxyphene, I (b), has been described as the major metabolite of d-propoxyphene, II (b) wherein Alk is ethyl [*J. Pharm. Exp. Therap.* 125, 14 (1959) and *Life Sci.* 12, 463–473 (1973)].

Illustrative of the haloalkyl carbamates formed as intermediates in the present process are the following:

4-[N-methyl-N-(2-iodoethoxycarbonyl)amino]-1,2-diphenyl-3-methyl-2-propionoxybutane,
4-[N-methyl-N-(2-iodoethoxycarbonyl)amino]1,2-diphenyl-3-methyl-2-butyroxybutane,
3-acetoxy-6-[N-methyl-N-(2-iodoethoxycarbonyl)amino]-4,4-diphenylheptane,
3-propionoxy-6-[N-methyl-N-(2,2,2-trichloroethoxycarbonyl)amino]-4,4-diphenylheptane.
3-butyroxy-6-[N-methyl-N-(2-iodoethoxycarbonyl)amino]-4,4-diphenylheptane, and the like.

The general procedures employed in the preparation of compounds of this invention are illustrated in the following examples.

EXAMPLE 1

4-[N-methyl-N-(2,2,2-trichloroethoxycarbonyl)amino]-3-methyl-1,2-diphenyl-2-propionoxybutane To 1690 gm. of d-propoxyphene hydrochloride (α-d-4-dimethylamino-3-methyl-1,2-diphenyl-2-propionoxybutane hydrochloride) in 3 liters of water was added sufficient ammonium hydroxide to make the solution slightly basic. d-Propoxyphene, being insoluble in the aqueous alkaline layer, separated and was extracted with two portions of diethyl ether. The ether extracts were combined; the combined extracts were washed with water and then dried over magnesium sulfate. The dried ether solution was filtered, and then the filtrate was concentrated *in vacuo*. d-Propoxyphene remained as a solid residue and, without further purification, was dissolved in 2400 ml. of benzene. The solution was dried by refluxing with a Dean-Stark water separator for one hour. Next, to the refluxing stirred benzene solution was added 1000 g. of trichloroethyl chloroformate in dropwise fashion at such a rate as to maintain an even reflux. After completion of the addition, the reaction mixture was refluxed for an additional two hours and then concentrated to half-volume by distilling off benzene over a one hour period. The concentrated reaction mixture was then allowed to stand at 25° C. for 16 hours.

The reaction mixture was next cooled to a temperature in the range 0–5° C. To decompose the excess trichloroethyl chloroformate, 25 ml. of formic acid was added followed by 50 ml. of triethylamine, both being added in dropwise fashion. Subsequently, the reaction mixture was stirred for 30 minutes and the reaction temperature allowed to rise to 25° C. The reaction mixture was then poured into sufficient water and diethyl ether to dissolve all the products present. 4-[N-methyl-N-(2,2,2-trichloroethoxycarbonyl)amino]-3-methyl - 1,2 - diphenyl-2-propionoxybutane formed in the above reaction was soluble in the ether layer which was separated, washed with 1N aqueous hydrochloric acid and then twice more with water. The ethereal solution was dried over magnesium sulfate, and the ether was evaporated therefrom *in vacuo*. The residue was triturated with a small volume of n-hexane and the resulting solution reconcentrated *in vacuo*, thereby removing the last traces of ether. A large volume of n-hexane was added to dissolve the resulting residue, and the resulting solution was cooled to 0° C. 4-[N-methyl-N-(2,2,2 - trichloroethoxycarbonyl)amino]-3-methyl-1,2-diphenyl-2-propionoxybutane crystallized and was separated by filtration, m.p. 82–84° C., weight =2136 gm.

Analysis.—Calc. for $C_{24}H_{28}NO_4Cl_3$ (percent): C, 57.55; H, 5.63; N, 2.80. Found (percent): C, 57.64; H, 5.80; N, 2.69.

Following the above procedure, α-d-4-dimethylamino-3-methyl-1,2-diphenyl-2-acetoxybutane was treated with trichloroethyl chloroformate to form α-d-4-[N-methyl-N-(2,2,2-trichloroethoxycarbonyl)amino] - 3 - methyl-1,2-diphenyl-2-acetoxybutane; m.p. 96–98° C.

Analysis.—Calc. for $C_{23}H_{26}NO_4Cl_3$ (percent): C, 56.75; H, 5.38; N, 2.88. Found (percent): C, 56.52; H, 5.20; N, 2.87.

Also following the above procedure, α-l-acetylmethadol was reacted with trichloroethyl chloroformate to form the α-l-noracetylmethadol trichloroethyl carbamate [α-l-3-acetoxy-6-[N-methyl - N - (2,2,2-trichloroethoxycarbonyl)amino]-4,4-diphenylheptane].

EXAMPLE 2 d-Norpropoxyphene Maleate Salt

A solution of 1500 gm. of 4-[N-methyl-N-(2,2,2-trichloroethoxycarbonyl)amino]-3-methyl - 1,2 - diphenyl-2-propionoxybutane, from Example 1, in 3000 ml. of DMF and 200 ml. of formic acid was prepared and cooled to +5° C. Four hundred and fifty three grams of powdered zinc was added in portions. After the addition had been completed, the reaction mixture was stirred for an additional hour at about 0° C. The reaction mixture was then filtered to remove excess zinc. The filtrate, containing d-norpropoxyphene formed in the above reaction, was poured into 10 liters of water, and 600 ml. of 12N hydrochloric acid was added. Insoluble zinc salts were removed by filtration. The acidic filtrate, containing d-norpropoxyphene as a salt, was extracted twice with ethyl acetate to remove any starting material, 4-[N-methyl-N-(2,2,2-trichloroethoxycarbonyl)amino] - 3 - methyl-1,2-diphenyl-2-propionoxybutane. The ethyl acetate extracts were combined, and the combined extracts in turn were extracted twice with 1N hydrochloric acid. The aqueous acid layers were combined with the original acidic extract, and the combined extracts were cooled to 0° C. and then basified with 14N ammonium hydroxide. d-Norpropoxyphene, being insoluble in aqueous base, separated and was extracted with ethyl acetate. Two more ethyl acetate extracts of the aqueous basic layer were made. The ethyl acetate extracts were combined; the combined extracts were washed with water at 0° C., cooled to —5° C., and dried.

A solution of 348 g. of maleic acid in the minimum volume of acetone required for solution at 25° C. was added to the cold dry ethyl acetate solution of d-norpropoxyphene obtained as above. The resulting solution was thoroughly mixed. The maleic acid salt of d-norpropoxyphene precipitated and was collected by filtration, m.p. 159–160° C., wt. 906 g.

Analysis.—Calc. for $C_{25}H_{31}NO_6$ (percent): C, 68.01; H, 7.08; N, 3.17. Found (percent): C, 67.81; H, 7.09; N, 3.19.

Following the above procedure, α-d-4-[N-methyl-N-(2,2,2-trichloroethoxycarbonyl)amino] - 3 - methyl-1,2-diphenyl-2-acetoxybutane was treated with zinc dust and formic acid in DMF and the product was converted to the maleic acid salt of α-d-4-methylamino-3-methyl-1,2-diphenyl-2-acetoxybutane, m.p. 130–131° C.

Analysis.—Calc. for $C_{24}H_{29}NO_6$ (percent): C, 67.43; H, 6.84; N, 3.28. Found (percent): C, 67.64; N, 6.78; N, 3.06.

Also following the above procedure, α-l-3-acetoxy-6-[N-methyl - N - (2,2,2-trichloroethoxycarbonyl)amino]-4,4-diphenylheptane was treated with zinc dust and formic acid in DMF to prepare 3-acetoxy-6-methylamino-4,4-diphenylheptane (α-l-noracetylmethadol), isolated as its hydrochloride salt, m.p. 234–235° C., $[\alpha]_D^{25}$=67.8° (C.=1, $H_2O$).

EXAMPLE 3 d-Norpropoxyphene Hemi-citrate Salt

To a slurry of 1186 g. of d-norpropoxyphene maleate in three liters of cold water and one liter of cold ethyl acetate was added one liter of cold (0–5° C.) 14N ammonium hydroxide. Sufficient solid sodium chloride was added to the aqueous alkaline layer to separate the resulting emulsion. d-Norpropoxyphene free base was insoluble in the alkaline solution and was separated. The free base was extracted with three equal volumes of ethyl acetate. The ethyl acetate extracts were combined, washed twice with water (5° C.), and then dried. The d-norpropoxyphene solution thus obtained was treated with a solution of 310 gm. of citric acid monohydrate in 700 ml. of acetone (which solution had been previously dried over magnesium sulfate). d-Norpropoxyphene hemicitrate crystallized rapidly, and was separated by filtration and dried in vacuo. M.p. 152–154° C., wt., 1100 g.

Analysis.—Calc. for $C_{48}H_{62}N_2O_{11}$ (percent): C, 68.39; H, 7.41; N, 3.32. Found (percent): C, 68.14; H, 7.17; N, 3.20.

We claim:

1. A process for the preparation of a compound of the formula:

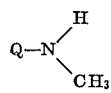

wherein Q is

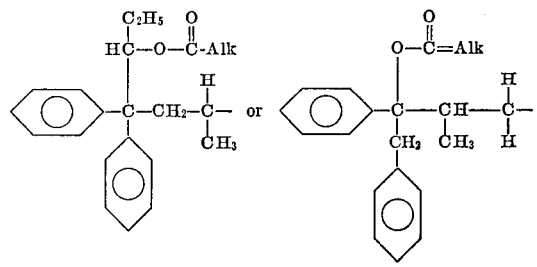

and wherein Alk is $C_1$–$C_3$-alkyl
or an acid addition salt thereof comprising the steps of:
A. reacting a haloalkyl chloroformate of the formula

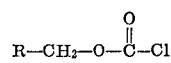

wherein R is —$CH_2I$ or —$CCl_3$ with a tertiary amine of the formula

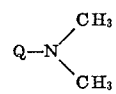

wherein Q is the same as above, at a temperature of 60–180° C. to produce a haloalkyl carbamate of the formula

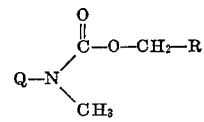

wherein Q and R are the same as above,
B. removing the carbamate group by reduction with zinc dust, and
C. then isolating the secondary amine thus formed either as the free base or as an acid addition salt thereof.

2. The process of Claim 1 wherein an inert organic cosolvent is used for Step A.

3. The process of Claim 2 wherein the inert organic cosolvent is benzene.

4. The process of Claim 1 wherein a carboxylic acid and an inert cosolvent are used for Step B.

5. The process of Claim 4 wherein the inert cosolvent is dimethylformamide.

6. The process of Claim 4 wherein the carboxylic acid used in Step B is formic acid.

7. The process of Claim 1 wherein:
Q is

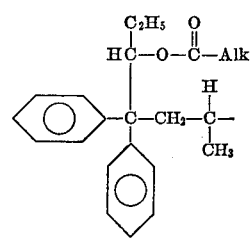

8. The process of Claim 7 wherein the product is isolated as its hydrochloride salt.
9. The process of Claim 1 wherein:
Q is
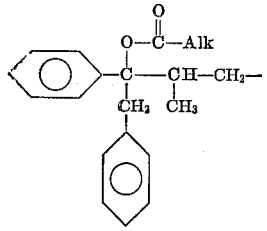
10. The process of Claim 9 wherein the product is first isolated as its maleate salt.
References Cited
UNITED STATES PATENTS
3,021,360   2/1962   Pohland _____ 260—490
3,213,128  10/1965   Fornefeld et al. _____ 260—490
VIVIAN GARNER, Primary Examiner
U.S. Cl. X.R.
260—471 C